United States Patent [19]

Whittenberger

[11] Patent Number: 4,985,388

[45] Date of Patent: Jan. 15, 1991

[54] CATALYTIC EXHAUST PIPE INSERT

[75] Inventor: William A. Whittenberger, Garrettsville, Ohio

[73] Assignee: W. R. Grace & Co.-Conn., New York, N.Y.

[21] Appl. No.: 373,241

[22] Filed: Jun. 29, 1989

[51] Int. Cl.$^5$ .......................... B01J 32/00; B01J 35/02
[52] U.S. Cl. ...................................... 502/439; 502/527
[58] Field of Search ................. 502/439, 527; 422/180

[56] References Cited

U.S. PATENT DOCUMENTS

| | | | |
|---|---|---|---|
| 3,513,109 | 5/1970 | Stiles | 252/462 |
| 3,840,471 | 10/1974 | Acres | 252/432 |
| 4,318,894 | 3/1982 | Hensel et al. | 502/527 X |
| 4,414,023 | 11/1983 | Aggen et al. | 75/124 |
| 4,711,009 | 12/1987 | Cornelison et al. | 29/157 |
| 4,847,230 | 7/1989 | Cyron | 502/527 X |
| 4,857,413 | 8/1989 | Hashimoto et al. | 502/527 X |

FOREIGN PATENT DOCUMENTS 55-145537  11/1980  Japan ................................. 502/527

Primary Examiner—W. J. Shine
Attorney, Agent, or Firm—Edward J. Cabic

[57] ABSTRACT

There has been provided a catalytically active insert assembly for insertion in an exhaust pipe and characterized by a metal support having at least one layer of a catalytically active thin metal foil applied to and secured to the surface or surfaces thereof. The foil may be corrugated or not. The assemblies hereof are inexpensive to manufacture, easy to install, and are effective to reduce pollutants contained in exhaust gas to environmentally acceptable levels.

20 Claims, 2 Drawing Sheets

CATALYTIC EXHAUST PIPE INSERT

This invention relates, as indicated, to an insert for an exhaust pipe, particularly for an exhaust pipe for an internal combustion engine, and especially for a motorcycle exhaust pipe. The drive to clean up the atmosphere has extended to smaller internal combustion engines, e.g., motorcycles, mopeds, lawn mowers, boat motors, etc. The devices of the present invention are characterized by low cost, ease of manufacture, ease of installation, effectiveness and low back pressure which are particularly important in the case of two-stroke engines.

BACKGROUND OF THE INVENTION AND PRIOR ART

Although the automobile or passenger car has long been provided with catalytic converter means in the exhaust system, the exhaust pipes of smaller internal combustion engines have not been significantly modified in respect of pollution reduction. The ceramic monoliths of current design do not well lend themselves to adaptation to the smaller engines. A principal problem with the ceramic monoliths used in catalytic converters is fragility, and the vibration induced by small engines, especially two stroke low horsepower engines, exacerbates this problem. Moreover, ceramic monoliths must be cast or extruded which severely limits design to straight through cells in the monolith. Some of the exhaust lines of small engines are not straight and do not adapt well to cores with an axis that is straight to such designs. The introduction of corrugated thin metal monoliths has overcome the problem of fragility, and enabled design variations to fit the motorcycle exhaust pipe geometry.

The present invention is an improvement in the means for catalyzing oxidation of pollutants, such as, carbon monoxide and unburned hydrocarbons, especially in the exhaust lines of small engines, or engines in which the configuration of the exhaust line does not readily lend itself to the use of ceramic monoliths. It has been found that adequate catalytic conversion of the pollutant materials in the exhaust to environmentally acceptable materials may be inexpensively and effectively achieved by providing a novel insert adapted to fit within the current exhaust line. This insert depends upon a metal oxide coated thin metal strip desirably having a catalyst deposited on or absorbed in the pores of the metal oxide coating. Usually, this coating is alumina applied by wash coating the metal strip and firing to firmly adhere the coating to the metal surface. The thin metal strip may be corrugated. The strip is applied to a metal form either by layering the strip on the surface of the metal form or wrapping the flexible foil about the metal form. The metal form may have any configuration, e.g., a flat plate, or a three dimensional configuration, e.g., a tube of any desired cross-sectional form, e.g., circular, square or triangular. The assembly of the catalyst containing thin metal foil with the metal form is adapted to be inserted within the exhaust pipe and fastened or otherwise secured therein by any suitable means.

Reference may be had to the Cornelison et al U.S. Pat. No. 4,711,009 dated Dec. 8, 1987 for a disclosure of a process for making a corrugated thin metal foil or strip and applying an alumina wash coat and catalyst to the surface thereof. This patent also discloses accordion folding of the corrugated foil, but this operation is not a part of the present invention. This patent is incorporated herein by reference thereto as if the disclosure thereof had been reproduced herein in toto.

U.S. Pat. No. 3,840,471 to Acres dated Oct. 8, 1974 discloses a catalyst useful herein and comprising platinum, rhodium and a base metal, e.g., nickel, cobalt, iron, copper, molybdenum indium, tin, zinc, silver or chromium. A process for applying the catalyst coatings and useful herein, is described in the Stiles U.S. Pat. No. 3,513,109 dated May 19, 1970.

BRIEF STATEMENT OF THE INVENTION

Briefly stated, the present invention is a catalytically active assembly for insertion into an exhaust pipe and comprising a noncorrodible metal form and a catalyst-containing thin metal strip layer secured to the surface of the form. The invention also contemplates an exhaust pipe having the catalytic assembly included therein. In more particular embodiments of the invention, the thin metal strip is corrugated. The metal plate may be of curved configuration with the thin metal strip wrapped around the plate for inclusion in a curved exhaust pipe, e.g., a motorcycle exhaust pipe.

BRIEF DESCRIPTION OF THE DRAWINGS

The invention may be better understood by having reference to the annexed drawings wherein there are illustrated several embodiments of the invention, and wherein:

FIG. 1 represents the best mode of carrying out this invention.

DETAILED DESCRIPTION OF THE DRAWINGS

As indicated above, the present invention is in an insert assembly for an exhaust line. The assembly comprises a noncorrodible (that is, noncorrodible in the exhaust environment in which it is used) metal support form which may be planar, or shaped, e.g., a tube of circular, triangular, rectangular, or other polygonal, cross-sectional configuration, and having disposed on the sides thereof, e.g., by wrapping or layering, a catalyst-containing thin metal strip which may desirably be corrugated. The ends of the strip are fastened or otherwise secured, e.g. by welding, to the metal support form. In use, the assembly hereof is encased in an exhaust pipe or manifold attached to an internal combustion engine. The engine may be spark or compression ignited, or be a gas turbine, and utilize a fuel comprising a hydrocarbon or alcohol containing from 1 to 12, or more, carbon atoms in the average molecule.

Figure 1:
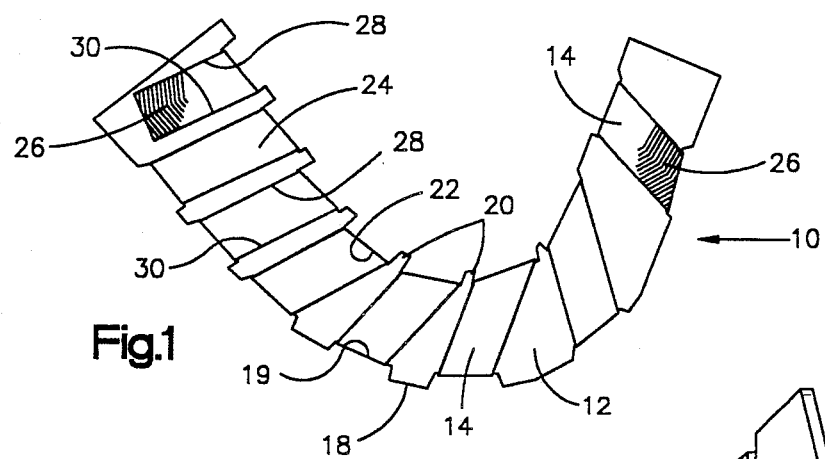
FIG. 1 is a curved flat plate having a catalyst-containing thin metal strip wrapped about the plate and defining a catalytic assembly in accordance herewith.
Figure 2:
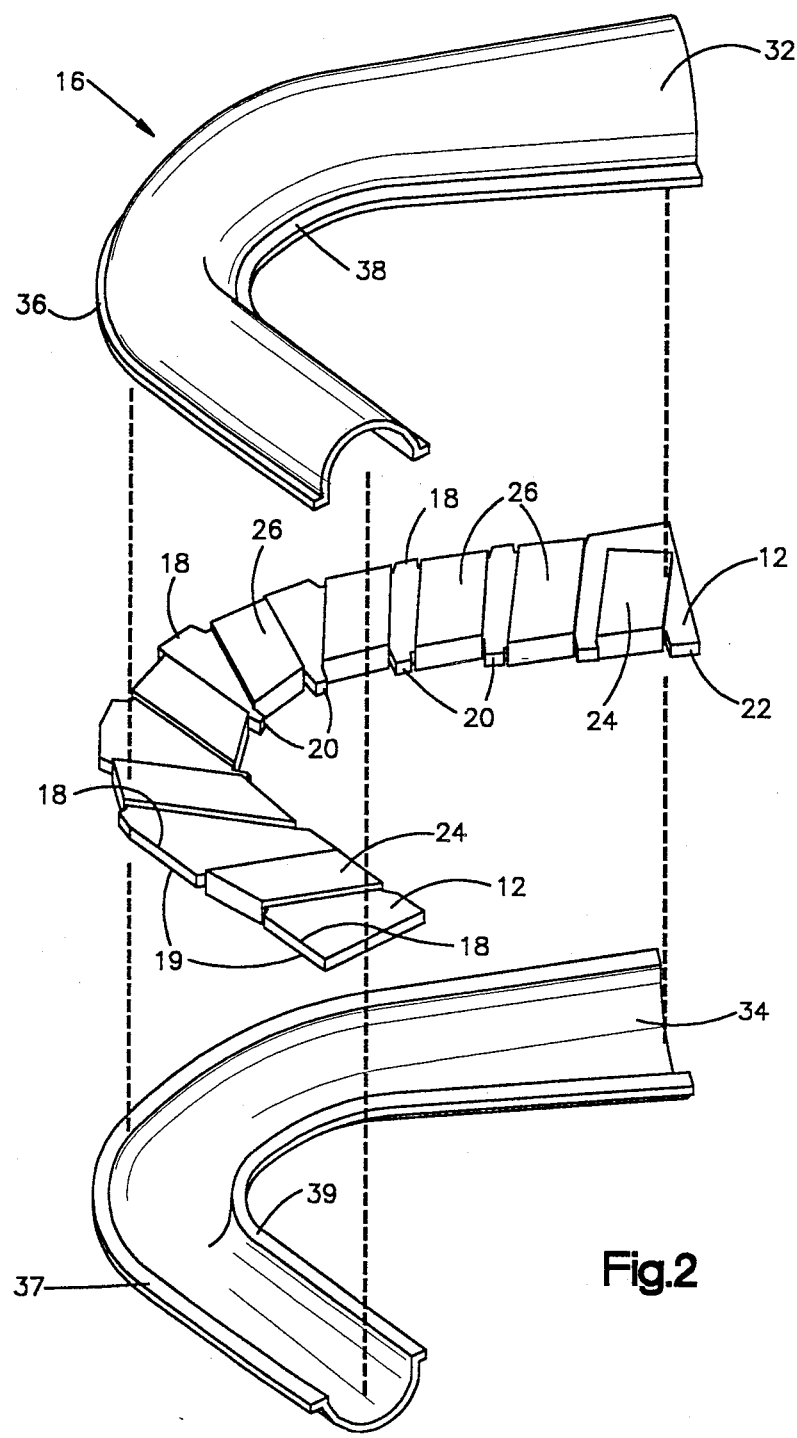
FIG. 2 is an exploded perspective view showing the assembly of FIG. 1 disposed between flanged half shells of a curved motorcycle exhaust pipe.

Referring now more particularly to FIGS. 1 and 2, FIG. 1 shows an assembly 10 in accordance herewith.

The assembly includes a flat stainless steel plate 12 having spirally wrapped thereabout a corrugated thin stainless steel metal strip 14. The desired material of construction of each of these elements 12 and 14 is a ferritic stainless steel, particularly one such as described in the Aggen et al U.S. Pat. No. 4,414,023 dated Nov. 8, 1983. Specific alloys consist essentially of 8% to 25% chromium, 3% to 8% aluminum, 0.002% to 0.05% of at least one rare earth metal selected from the group consisting of cerium, lanthanum, neodymium, and praseodymium, the total of the rare earths being up to 0.060%, up to 4% silicon, 0.06% to 1% manganese and other normal steel making impurities, the remainder being iron. A specific alloy contains about 20% chromium, about 5% aluminum, about 0.05% cerium, and the balance iron along with the trace elements mentioned above. Such an alloy is currently commercially available from Allegheny Ludlum as Alfa-IV stainless steel.

The plate 12 shown in FIGS. 1 and 2 is curved in the pattern of the exhaust pipe 16 (FIG. 2) of a currently available motorcycle exhaust and dimensioned to span the exhaust pipe 16 at its major cross-sectional dimension, e.g., diametrically. The plate 12 is notched to provide projections 18 along the outer marginal edge 19 of the flat plate 12, and projections 20 along the inner marginal edge 22. The projections 18 and 20 serve as guides for the spiral wrapping 24 of corrugated 26 thin stainless steel strip. In the embodiment shown in FIGS. 1 and 2, the corrugated thin metal strip 24 is 33 inches long and 1" wide.

The corrugation pattern in cross-section is preferably sinusoidal or triangular with the apices of the triangular wave forms rounded off, and may be a chevron or herringbone pattern between the marginal edges 28 and 30 of the strip 24 as shown in FIG. 1 or have straight corrugations normal to and extending between the marginal edges 28 and 30 of the strip 24, or be oblique to the marginal edges 28 and 30 by up to 15 degrees. Generally, the corrugations have an amplitude of from about 0.015" to about 0.25", e.g., 0.025" and a pitch of from about 0.02" to about 0.2", e.g., 0.076". In the chevron pattern, the angle of deviation from of the sides of the chevron from a line normal to the marginal edges of the strip, e.g., strip 24, is from about 3 degrees to about 10 degrees, i.e., the included angle defined by the chevron pattern is from about 160 degrees to about 176 degrees. The length of the side of a chevron is from about 0.75" to about 1.25". Both the straight corrugation and the chevron pattern corrugation are formed by passing the thin metal strip between corrugating rolls from a leading edge to a trailing edge. The thin metal has a thickness of from about 0.001" to about 0.008", 0.002" being a preferred thickness. The steel supports hereof desirably have a thickness of 16 gauge although any suitable thickness may be used.

The thin metal desirably has a thin coating of aluminum metal on the surface thereof, or contains aluminum as a part of the alloy composition (3% to 6% Al) as produced by the manufacturer. During heat treatment, this aluminum coating, or the alloy aluminum, is at least partially converted to alumina at the surface, to provide a desired catalyst support base. Other refractory metal oxides, or mixtures thereof, may be used as this catalyst support base, e.g., silica, titania, zirconia, vanadia, etc.

The catalyst may be any of those shown in the prior art, and particularly the noble metals platinum, palladium, rhodium, ruthenium, or mixtures thereof. In some cases, an added catalyst is not necessary because at the temperatures encountered in the exhaust, the metal oxide coating itself becomes catalytically active.

FIG. 2 shows in exploded prespective relation a pair of flanged half shells 32 and 34 having outwardly extending flanges 36 and 38 along the confronting marginal edges 37 and 39 of the half shells 32 and 34, respectively. The projections 18 and 20 of the flat plate 12 are adapted to fit between the flanges 36, 37 and 38, 39 and be captured therebetween, and the entire exhaust pipe assembly welded along the resulting seam to form the exhaust pipe 16. This is suitably fitted (by means not shown) for attachment to the engine of a motorcycle. A decorative shroud (not shown) may be provided to surround the basic exhaust pipe.

Figure 3:
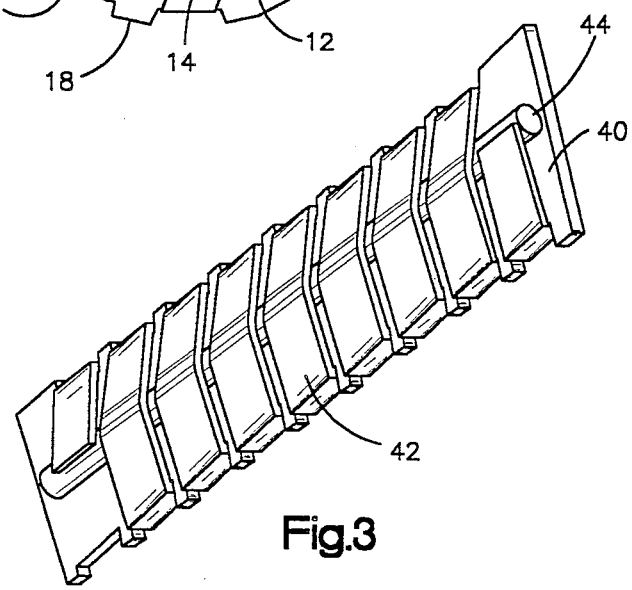
FIG. 3 is another assembly using a rectangular flat plate wrapped with a catalyst-containing thin metal strip. A bar is provided to space the catalyst-containing foil from the surface of the plate.

FIG. 3 shows another insert assembly based on a rectanguler flat plate 40 also having a thickness of about 16 gauge. This assembly has a wrapping of catalytically active corrugated thin metal foil 42 as above described secured to the rectangular plate 40 as by welding at each end of the strip. Each winding of the wrapping desirably does not overlap the previous winding, as such covered catalytic surface is not very effective in reducing pollutants. In the manufacture of the corrugated thin metal strip, it is convenient, albeit not essential, to coat both sides of the strip with refractory metal oxide such as, alumina, and a catalyst as described, for example in the aforesaid U.S. Pat. No. 4,711,009. In order to improve the efficiency of the conversion to harmless compositions, e.g., water and carbon dioxide, a bilaterally coated strip may be spaced from direct contact with the surface of the support member, e.g., support member 40, by any suitable spacer means, such as, a longitudinally extending spacer bar 44. In this way, both surfaces of the catalytic thin metal foil 42, and the foils in the previous illustrations may be utilized for contact with the exhaust gas.

Figure 4:
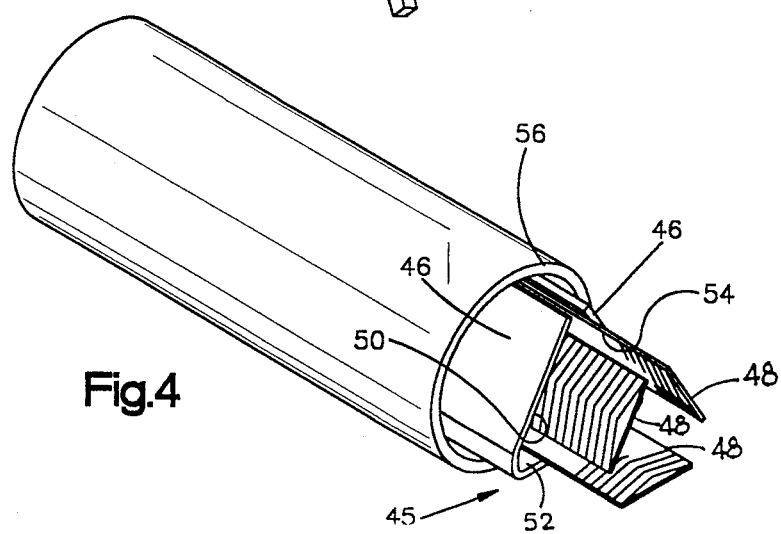
FIG. 4 is another assembly in accordance herewith partially telescoped and showing the use of a straight exhaust pipe and a triangular metal form having catalyst-containing thin metal strips longitudinally applied internally to the sides.

FIG. 4 shows another assembly 45 useful as an exhaust pipe insert. In this case a flat plate of stainless steel, such as described above, is folded to have a desired geometric configuration such as a generally triangular shape 46. Although the catalytic thin metal foil may be wrapped about the triangular form, in this case it is shown as longitudinally extending layers 48 applied to the interior surfaces 50, 52 and 54 of the triangular support form and secured thereto as by spot welding at each end. Also shown in FIG. 4 is a straight exhaust pipe section 56, partially cut away, and having inserted therein the assembly 45.

There has thus been provided a catalytically active insert assembly for insertion in an exhaust pipe of virtually any shape, straight, or curved, or compound, and characterized by a metal support, preferably stainless steel, having one or more layers of catalytically active thin metal foil applied to and secured to the surfaces thereof. The foil may be corrugated or not, although a corrugated foil provides for substantially greater contact surface. The assemblies hereof are inexpensive to manufacture, easy to install, and are effective to reduce pollutants contained in exhaust gas to environmentally acceptable levels. The devices hereof are also characterized by low back pressure which is especially important in two-stroke internal combustion engines.

What is claimed is:

1. A catalytic assembly for insertion into an exhaust pipe comprising a noncorrodible metal from adapted to fit within said pipe, and a catalyst-containing thin metal strip wrapped about said form and secured thereto at each end thereof.

2. An assembly in accordance with claim 1 wherein the thin metal strip is corrugated.

3. An assembly in accordance with claim 1 wherein the thin metal strip is corrugated in a herringbone pattern.

4. An assembly in accordance with claim 2 wherein the corrugations have an amplitude of from 0.015 inch to 0.25 inch and a pitch of from 0.02 inch to 0.2 inch.

5. An assembly in accordance with claim 4 wherein the corrugations have a generally triangular wave form.

6. An assembly in accordance with claim 2 wherein the corrugations have a generally sinusoidal wave form.

7. An assembly in accordance with claim 1 wherein the metal form has a planar surface.

8. An assembly in accordance with claim 7 wherein the metal form has a curved planar surface.

9. An assembly in accordance with claim 7 wherein the metal form has a straight planar surface.

10. An assembly in accordance with claim 1 wherein the metal form has a generally polygonal cross-section.

11. An assembly in accordance with claim 10 wherein the polygonal cross-section is triangular.

12. An assembly in accordance with claim 7 wherein the metal form is provided with a plurality of spaced projections extending along opposite marginal edges.

13. An assembly in accordance with claim 1 including an exhaust pipe surrounding the metal form and thin metal strip wrapping.

14. An assembly in accordance with claim 13 wherein the exhaust pipe is formed of two half shells and the metal form has a planar surface adapted and dimensioned to fit between the shells.

15. An assembly in accordance with claim 14 wherein the half shells are each provided with laterally projecting flanges and the metal form is provided with spaced projections along the marginal edges adapted and dimensioned to coact with the laterally projecting flanges to secure the metal form within the exhaust pipe formed from said half shells.

16. An assembly in accordance with claim 1 including means for spacing the turns of catalyst-containing thin metal from the surface of the form.

17. An assembly in accordance with claim 1 wherein the metal strip is formed of stainless steel.

18. An assembly in accordance with claim 1 wherein the metal strip is formed of ferritic stainless steel.

19. An assembly in accordance with claim 1 wherein the metal strip is provided with a thin coating of aluminum oxide.

20. An assembly in accordance with claim 19 wherein a catalyst is supported on the aluminum oxide coating.

* * * * *

UNITED STATES PATENT AND TRADEMARK OFFICE
CERTIFICATE OF CORRECTION

PATENT NO. :  4,985,388
DATED      :  Jan. 15, 1991
INVENTOR(S) : William A. Whittenberger It is certified that error appears in the above-identified patent and that said Letters Patent is hereby corrected as shown below:

Column 4:
Claim 1, line 2, Change "from" to --form--.

Signed and Sealed this

Nineteenth Day of May, 1992

Attest:

DOUGLAS B. COMER

Attesting Officer

Acting Commissioner of Patents and Trademarks